June 30, 1931.  R. W. PORTER ET AL  1,812,369

PROJECTING MECHANISM AND GEAR STAGING DEVICE

Original Filed May 3, 1923   2 Sheets-Sheet 1

Inventors:
Russell W. Porter,
Robert O. Beardsley.
by Wright, Brown, Quinby & Shay
Att'ys.

June 30, 1931. R. W. PORTER ET AL 1,812,369
PROJECTING MECHANISM AND GEAR STAGING DEVICE
Original Filed May 3, 1923    2 Sheets-Sheet 2

Inventors:
Russell W. Porter,
Robert O. Beardsley.
by Wright, Brown, Quinby & May
Att'ys.

Patented June 30, 1931

1,812,369

UNITED STATES PATENT OFFICE

RUSSELL W. PORTER AND ROBERT O. BEARDSLEY, OF SPRINGFIELD, VERMONT, ASSIGNORS TO JONES & LAMSON MACHINE COMPANY, OF SPRINGFIELD, VERMONT, A CORPORATION OF VERMONT

PROJECTING MECHANISM AND GEAR STAGING DEVICE

Original application filed May 3, 1923, Serial No. 636,311. Divided and this application filed July 7, 1926. Serial No. 120,937.

This invention relates to a projector mechanism and a device for staging gears, these being more particularly intended for use in connection with measuring and comparing gears, and while not limited thereto, they have been more particularly designed as portions of a comparing and testing apparatus set forth and claimed in our application for patent Serial No. 636,311 for method and apparatus for measuring and comparing gears and the like, filed May 3, 1923, from which the subject matter of the present application has been divided. As disclosed in that application the gear to be tested is supported with relation to a light source and a lens in a manner to permit the image of a finder movable toward and from a tooth face of the gear and the image of the reflection of the finder in that face to be projected on a screen.

For a more complete understanding of the present invention, reference may be had to the accompanying drawings in which Figure 1 is a side elevation of a projector mechanism and staging device.

Figures 1, 2:
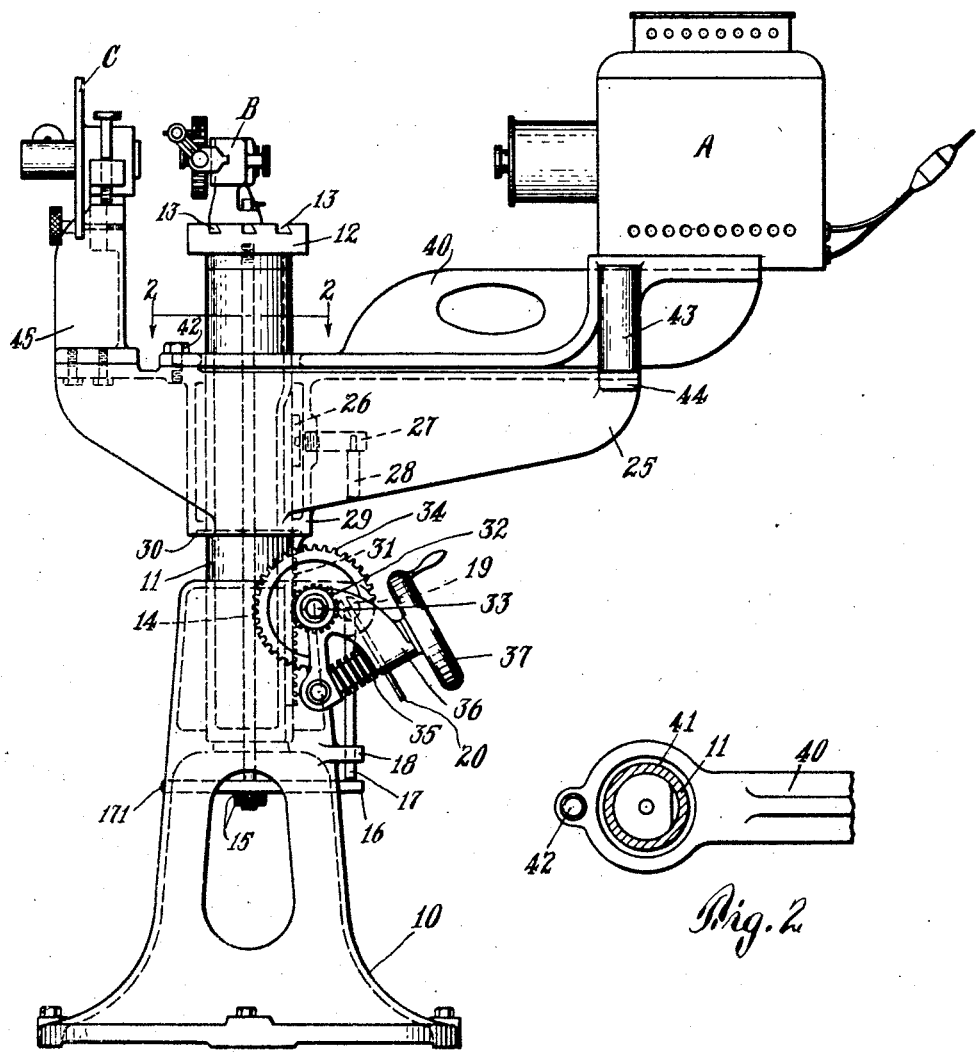
Figure 2 is a detail section on line 2—2 of Figure 1.

Referring to Figures 1 and 2, 10 indicates a machine base having upstanding thereon a cylindrical column 11 which carries rotatably on its upper end a table 12 having its upper face formed with grooves 13 thereacross to which may be fixed the staging device B. In order that this table may be fixed in any desired position of rotative adjustment to properly present the surface of the object to be tested to the lens it has fixed thereto a rod 14 which extends axially of the column and has threaded on its lower end a pair of knurled check nuts 15 forming an abutment. Engaging on the upper face of the top check nut is the intermediate portion of the lever 16 fulcrumed at 171 to the base 10. The opposite end of this lever has engaging thereon the lower end of a push rod 17 slidably mounted in lugs 18 projecting from the base 10. Engaging the upper end of this push rod 17 is a cam member 19 having an operating handle or lever 20 fixed thereto. By manipulation of this handle the cam 19 may be caused to press the rod 17 firmly against the abutment of lever 16 causing the rod 14 to be pressed downwardly to hold the table 12 firmly in position. By movement of the lever 20 in the opposite direction the cam 19 may be retracted from the push rod 17, thus relieving the tension on the rod 14 and permitting the table 12 to be turned. Slidably and rotatably mounted on the column 11 is a platform member 25. This member carries a curved shoe 26 engaging the peripheral face of the column and which may be tightened thereagainst by means of a clamping screw 27 having an actuating handle 28, the tightening of this shoe against the column acting to prevent rotation of the platform 25 relative to the column. The column passes through a sleeve portion 29 of the member 25, this sleeve portion serving to house the shoe 26; and the lower face of this sleeve is provided with an annular recess 30 within which extends the upper end of a rack bar 31 slidable in a vertical guideway in the column. The member 25 rests by its weight on the rack bar and by manipulation of the rack bar the height of the platform relative to the column may be adjusted. For this purpose a pinion 32 fixed to a shaft 33 journaled in the base 10 engages the teeth of the rack bar 31 and the shaft 33 has a worm wheel 34 with which engages a worm 35 supported in a bracket 36. This worm 35 is formed on or secured to a shaft which carries at its outer end an actuating hand wheel 37. The platform 25 is adapted to support the projecting lantern and the microscope or lens through which the images are to be projected. In order to support the lantern with capability of a slight amount of angular adjustment, an arm 40 has been provided which, as shown more clearly in Figure 2, has an aperture 41 therethrough near one end of somewhat greater diameter than the column and through which the column passes. The adjacent end of the arm is pivoted to the upper face of the platform by means of a pivot bolt 42. The opposite end of this arm has fixed thereto the projector A which is preferably provided with a light source of considerable power and concentrated in a small area such as may be provided by an electric arc. The arm 40 as shown is provided with a depending supporting flange 43 which is adapted to ride on a trackway 44 of a platform 25. By tightening the pivot bolt 42 the arm may be fixed against swinging movement,—the limits of which are defined by the engagement of the column with opposite sides of the opening 41. On the opposite side of the column 11 the platform 25 has a bracket 45 extending upwardly therefrom which supports the microscope or lens member C. While this member is preferably formed as a microscope for the purposes of this application it will be referred to as a lens, since it is only essential that the opticle effect of the lens be employed, the particular type of lens most suitable for the purpose being used, and the lens being so related to the projector as to receive the beam of light therefrom after passing across the edge of the object to be tested which is positioned in the focal plane of the lens.

Figure 3:
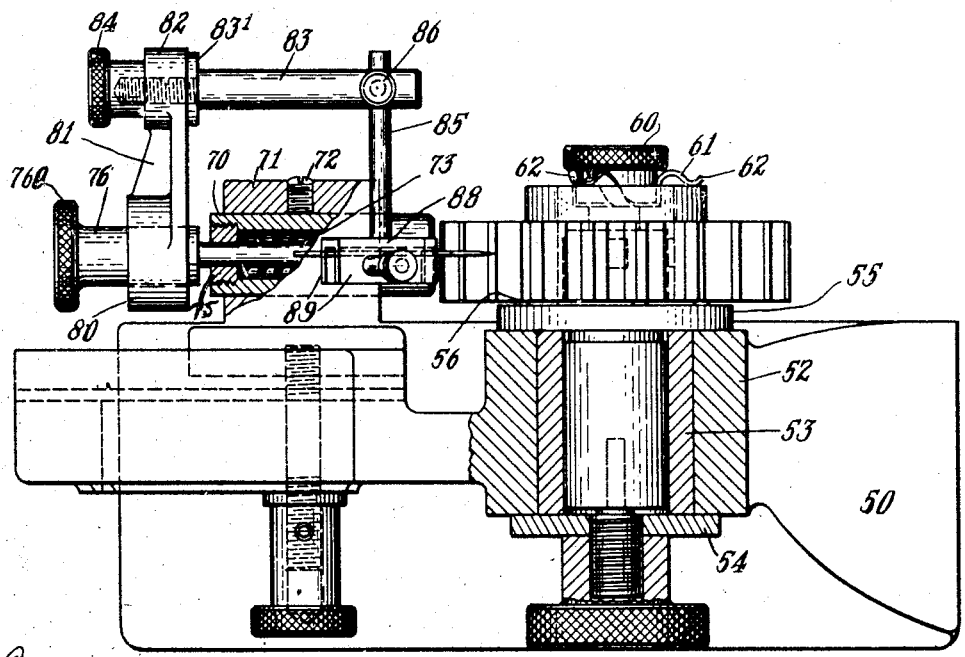
Figure 3 is a plan partly in section of the gear staging device.
Figure 4:
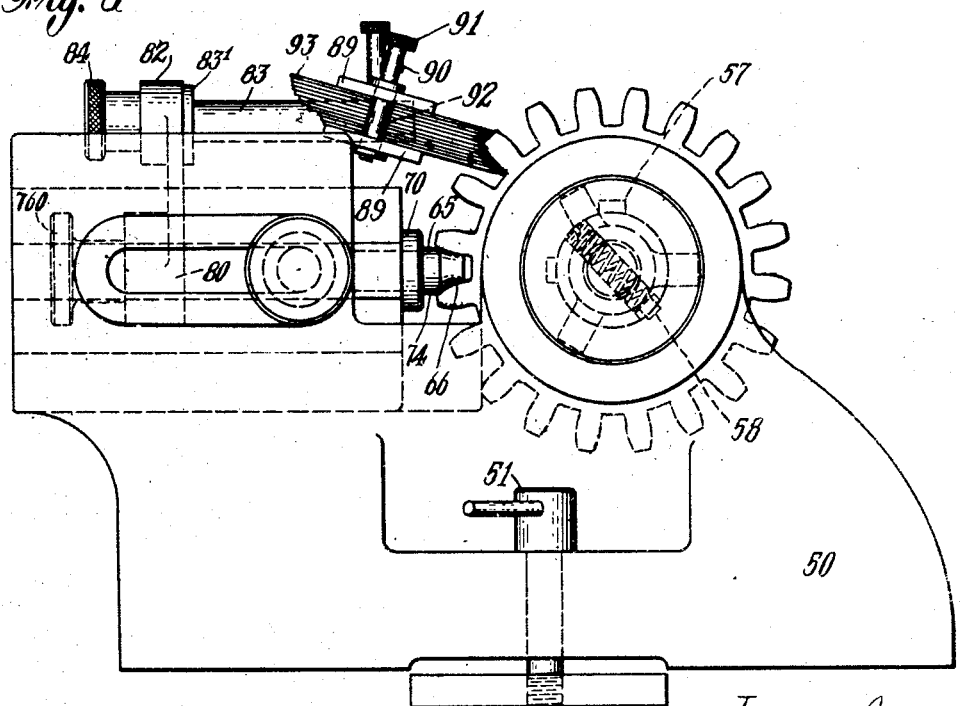
Figure 4 is an elevation of the same.

The staging device for the gear is shown more particularly in Figures 3 and 4, and comprises a standard 50 which is adapted to slidably engage the grooves 13 of the table 12 and be fixed in position thereon by means of a clamp 51. This standard 50 has a bearing 52 which as shown as a bushing 53 therein through which a mandrel 54 may be passed, this mandrel or object holder being constructed to receive the gear thereon. In order to support the gear with capability of rotation, if desired, the mandrel is provided with an annular flange 55 which may be seated against one face of the bearing 52 and on its opposite face it may have a plurality of projecting bosses 56, three being shown, against which one end face of the gear may engage to provide a three point support for the gear. The mandrel may also have a pair of angularly spaced bosses 57 projecting from its cylindrical periphery, and a plunger 58 spring pressed outwardly in angular relation to the bosses, the bosses and plunger being adapted to be within the bore of the gear and to engage its inner wall so as to support the gear in proper axial position. The gear may be held in position on the mandrel by means of a thumb nut 60 threaded on the end of the mandrel and engaging a member 61 having a plurality of outwardly extending spring fingers 62 positioned to engage on the opposite face of the gear from the bosses 56. By this means the gear is held with capability of rotation under a frictional resistance which may be varied by varying the tightness of the thumb nut 60 and with its edge face in which the contour line to be examined lies exposed to the beam of light.

The gear may be held in any desired one of a number of rotational positions by an indexing device, this device as shown comprising a plunger 65 having a conical end 66 engaging between adjacent teeth of the gear. The number of rotational positions in which the gear may be held is equal to the number of teeth thereof, and these positions are angularly spaced by aliquot parts of a circumference. Thus the indexing mechanism permits the gear to be rotated step by step through angles equal to that between the centers of successive gear teeth. The plunger is preferably mounted so as to be retractible at will in order to permit the gear to be rotated by hand to bring successive teeth into the field of the projected light beam. For this purpose it is shown as extending through a sleeve 70 which is fixed in position as by means of a set screw 72 within a boss 71 extending from the standard 50. A spring 73 surrounds a reduced portion of the plunger and reacts between its head 74 and a plug 75 threaded in the rear end of the sleeve. Outwardly of the plug this plunger has an actuating head 76 terminating in a knurled flange 760 by which it may be grasped. Also carried by the staging device B is the finder mechanism. The end 66 of the plunger may be made slightly eccentric to the main portion thereof by which means a delicate rotational adjustment of the gear may be produced by the rotation of the plunger. This facilitates the comparison of tooth outlines with each other or with a standard outline on the screen, the eccentric end 66 permitting an easy adjustment of the image on the screen to overcome slight errors of indexing and to make the projected image coincide as closely as possible with an outline on the screen. By using the plunger without angular adjustment or a plunger with a concentric end, errors of indexing of a gear cutter may be detected. This may be supported in any suitable way, but as shown is carried by the plunger to be retracted therewith. For this purpose the portion 76 of the plunger has engaging thereon a collar 80 which may be split, if desired, and clamped on the portion 76 by means of a screw (not shown), this collar 80 being formed at the end of an arm 81 having a perforated boss 82 at its opposite end through which passes a supporting rod 83. The rod 83 has a shoulder 83' thereon and the boss 82 is clamped between this shoulder and a knurled nut 84 threaded on the adjacent end of the rod. The opposite end of this rod has projecting therethrough at right angles a rod 85 which is axially adjustable therein and may be fixed in position by means of a thumb screw 86. One end of this rod 85 has a channel shaped supporting member 88 through the flanges 89 of which is passed a shaft 90 having a knurled head 91 by which it may be turned. Intermediate the flanges 89 the shaft 90 carries a sleeve 92 of friction material such as rubber, forming a yielding roller, which engages the outer faces of a series of rod or needle members 93 positioned between the sleeve 92 and the bottom of the channel 88 in a single plane between the flanges 89. By turning the shaft 90 the roller 92 engaging these needles, slides them in axial directions within the channel. By this means the points of the needles may be projected against the gear tooth to be measured each needle as it contacts with the gear being stopped thereby without interfering with the continued motion of the remaining needles which have not yet contacted with the gear. By this means all the points may be moved into contact with the face of the gear tooth which it is desired to test. The series of needles are adjusted to move in the plane of the gear which it is desired to test and by adjustment of the staging device and the lens this plane is adjusted to coincide with the focal plane of the lens.

Having thus described certain embodiments of this invention it should be evident that many changes and modifications might be made therein without departing from its spirit or scope as defined by the appended claims.

We claim:

1. In an apparatus of the class described, a gear staging device comprising means for supporting a gear with capability of indexed rotation, means to hold the gear stationary in indexed position only, and a finder adjustable toward and from a side face of a tooth of the gear.

2. In an apparatus of the class described, a gear staging device comprising means for supporting a gear with capability of rotation about its axis, means to hold the gear stationary in indexed position, and a finder comprising a series of rods arranged side by side in a plane and each terminating in a point, and means for moving said rods to bring said points toward and from a side face of the tooth of a gear in a desired plane between the gear end faces.

3. In an apparatus of the class described, a gear staging device comprising means for engaging within the bore of the gear and pressing radially outward against the side wall of the bore, means engaging the end faces of the gear to fix its axial position, and a locking member movable to engage between adjacent teeth of the gear to hold the gear fixed against rotation in indexed angular position.

4. In an apparatus of the class described, a gear staging device comprising means for engaging within the bore of the gear, means engaging the end faces of the gear to fix its axial position, means movable to engage between adjacent teeth of the gear to hold the gear against rotation in indexed angular position, and a finder movable toward and from a tooth face of the gear in a desired plane.

5. In an apparatus of the class described, means to hold an object, a plurality of rods arranged side by side in a plane, and means for holding said rods in side by side relation, said rod-holding means including a frictional surface engaging a side of each of said rods and movable to rub said rods in the direction of their length, whereby said rods tend to move lengthwise when said surface is moved.

6. In an apparatus of the class described, means to hold an object, a plurality of rods mounted side by side in one plane, and a member frictionally engaging said rods and actuable to move them toward and from said object, each rod as it strikes the object being stopped thereby while permitting further motion toward said object of other rods by further actuation of said friction member.

7. In an apparatus of the class described, means to hold an object, a plurality of rods mounted side by side in one plane, and a roller frictionally engaging said rods and turnable to move them toward and from said object, each rod as it strikes the object being stopped thereby while permitting further motion toward the object of other rods by further turning of said roller.

8. In an apparatus of the class described, means engageable within the bore and at its end faces for staging a gear, and a plunger projectable between a pair of adjacent teeth of said gear to engage the opposed faces of both teeth and to hold the gear fixed against turning in any indexed position.

9. In an apparatus of the class described, means engageable within the bore and at its end faces for staging a gear, a plunger projectable between a pair of adjacent teeth of said gear to hold it against turning in any indexed position, and a finder movable with said plunger and adjustable relative thereto toward and from a side face of a gear tooth.

10. In an apparatus of the class described, means engageable within the bore and at its end faces for staging a gear, and a plunger projectable between a pair of adjacent teeth of said gear to hold it against turning in any indexed position, the gear engaging portion of said plunger being eccentric whereby turning of said plunger effects a fine adjustment of said indexed position.

11. In an apparatus of the class described, means for staging a gear to permit rotation thereof on its axis, a plunger movable toward and from said axis to engage opposite faces of teeth on said gear to hold the gear fixed in an indexed position, a frame carried by said plunger, and a finder mounted on said frame and adjustable relatively thereto toward and from a side face of a gear tooth.

In testimony whereof we have affixed our signatures.

RUSSELL W. PORTER.
ROBERT O. BEARDSLEY.